United States Patent
Bentley et al.

(10) Patent No.: US 9,503,488 B2
(45) Date of Patent: Nov. 22, 2016

(54) SYSTEM AND METHOD FOR VIRTUAL CALL HOLD

(75) Inventors: Jon L. Bentley, New Providence, NJ (US); Anjur S. Krishnakumar, Princeton, NJ (US); Parameshwaran Krishnan, Basking Ridge, NJ (US); Navjot Singh, Denville, NJ (US); Shalini Yajnik, Berkeley Heights, NJ (US)

(73) Assignee: Avaya Inc., Santa Clara, CA (US)

( * ) Notice: Subject to any disclaimer, the term of this patent is extended or adjusted under 35 U.S.C. 154(b) by 364 days.

(21) Appl. No.: 13/232,661

(22) Filed: Sep. 14, 2011

(65) Prior Publication Data

US 2013/0063543 A1    Mar. 14, 2013

(51) Int. Cl.
*H04L 29/06* (2006.01)
*H04M 3/56* (2006.01)
*H04N 7/15* (2006.01)

(52) U.S. Cl.
CPC ......... *H04L 65/403* (2013.01); *H04L 65/1083* (2013.01); *H04L 65/1096* (2013.01); *H04M 3/565* (2013.01); *H04M 2203/253* (2013.01); *H04M 2203/256* (2013.01); *H04M 2203/258* (2013.01); *H04N 7/15* (2013.01)

(58) Field of Classification Search
CPC ..................... H04M 3/567; H04N 7/15; H04L 12/1822; H04L 12/4641; H04L 2012/2849
USPC .................................... 379/202.01; 348/14.08
See application file for complete search history.

(56) References Cited

U.S. PATENT DOCUMENTS

| 5,627,978 | A * | 5/1997 | Altom et al. ................. 715/758 |
| 2004/0246332 | A1 * | 12/2004 | Crouch ....................... 348/14.08 |
| 2006/0111085 | A1 * | 5/2006 | Lee ......................... H04M 3/02 455/412.2 |
| 2007/0042792 | A1 * | 2/2007 | Perfetto ............ H04M 3/42263 455/461 |
| 2008/0280639 | A1 * | 11/2008 | Alfia ................. H04M 1/72519 455/551 |
| 2010/0208880 | A1 |  8/2010 | Gartner |

(Continued)

OTHER PUBLICATIONS

U.S. Appl. No. 12/392,823, Gartner et al., filed Feb. 25, 2009.

*Primary Examiner* — Amal Zenati
(74) *Attorney, Agent, or Firm* — Sheridan Ross P.C.

(57) ABSTRACT

Disclosed herein are systems, methods, and non-transitory computer-readable storage media for accomplishing a virtual call on hold. A client communication device, such as a telephone, smartphone, or computer, receives a notification of a communication session to which the user is invited, and establishes a relationship with the communication session. Alternatively, a server associated with the communication session can establish the relationship with the client communication device. Then, the communication device can present an indication of the relationship with the communication session for a duration of the communication session, such that the user can join the communication session at will via a communication channel, and such that the communication channel is not occupied by the communication session unless or until the user joins the communication session. The communication session can be a conference call, video conference, a multi-modal chat wherein multiple users communicate via different modalities.

20 Claims, 6 Drawing Sheets

(56) References Cited

U.S. PATENT DOCUMENTS

| | | |
|---|---|---|
| 2010/0246571 A1 | 9/2010 | Geppert et al. |
| 2010/0251142 A1* | 9/2010 | Geppert et al. ............... 715/758 |
| 2011/0038472 A1 | 2/2011 | Gartner et al. |
| 2011/0045813 A1* | 2/2011 | Choi .............................. 455/418 |
| 2011/0051917 A1 | 3/2011 | Chen et al. |

* cited by examiner

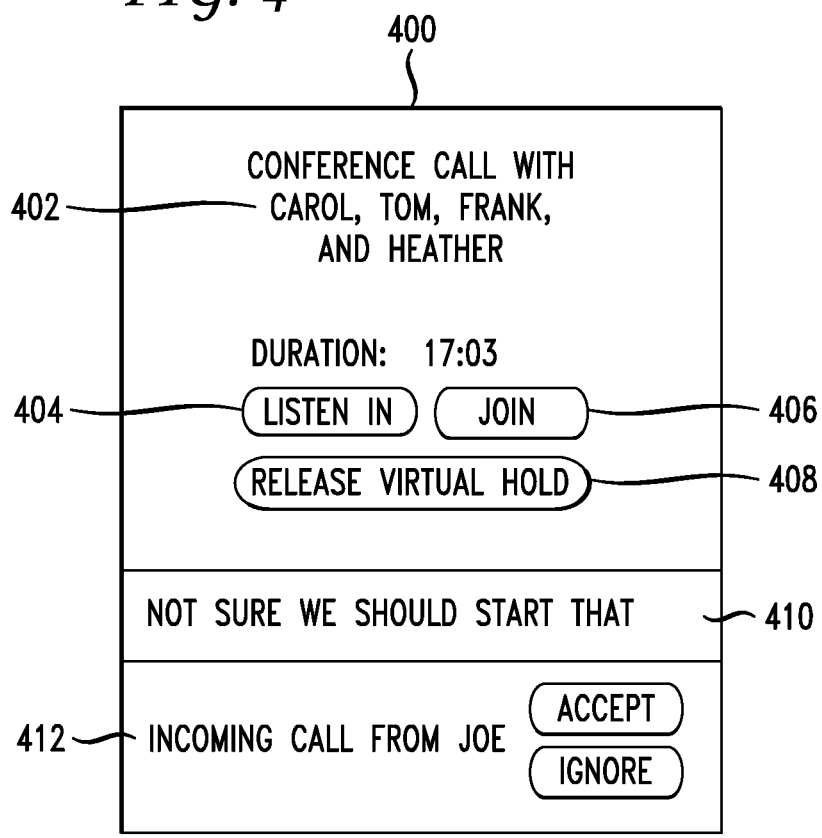

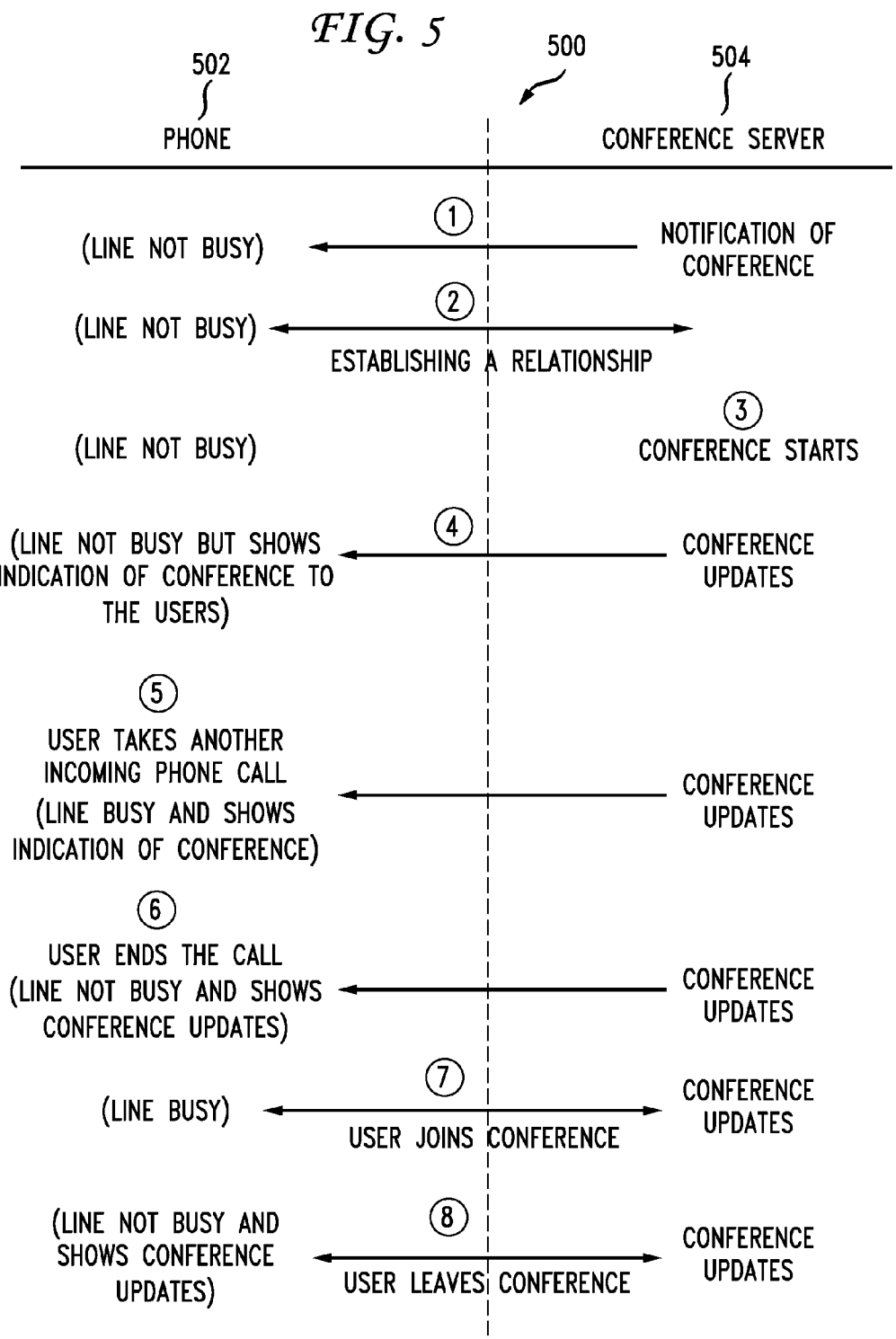

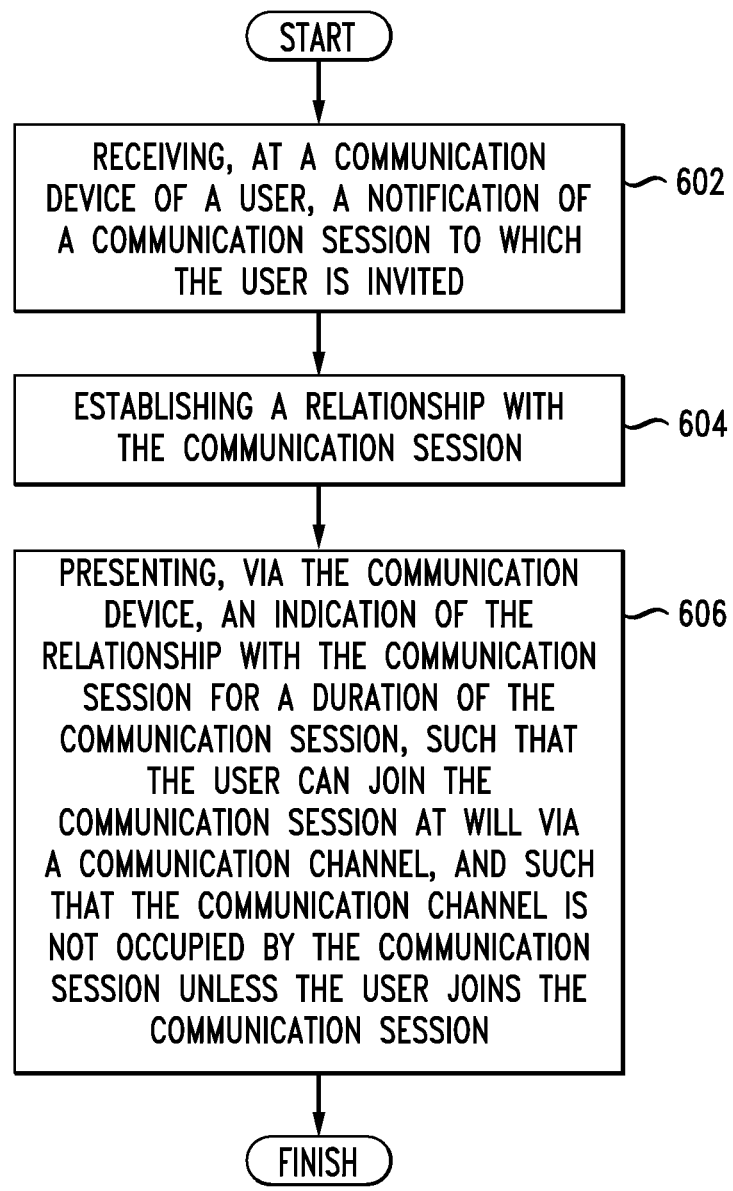

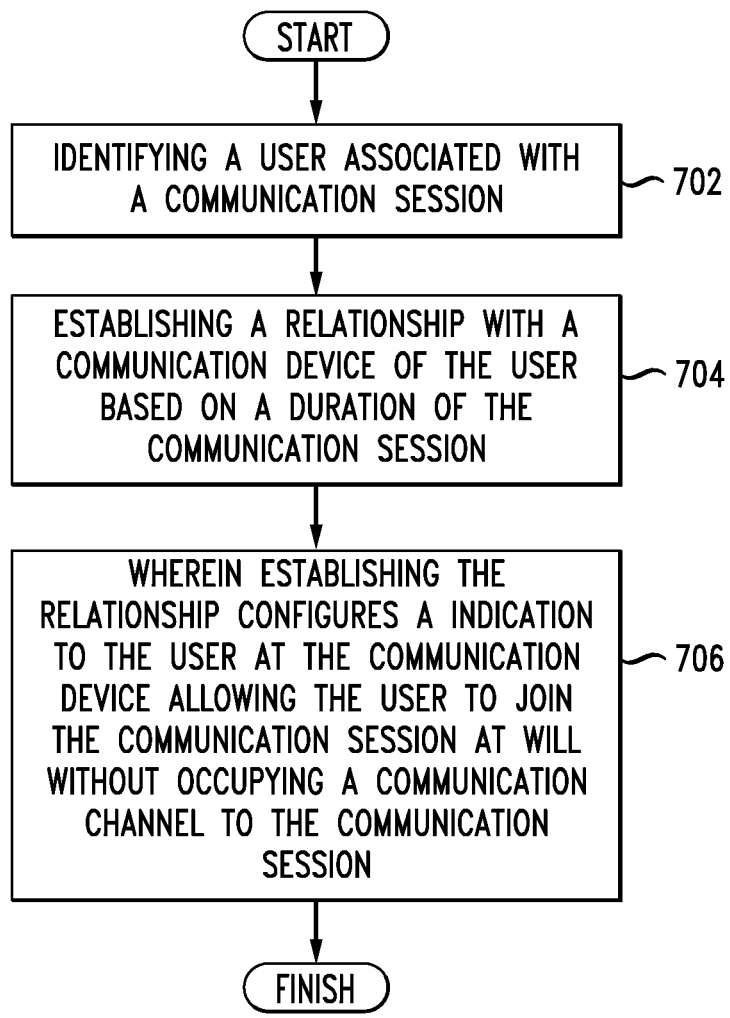

SYSTEM AND METHOD FOR VIRTUAL CALL HOLD

BACKGROUND

1. Technical Field

The present disclosure relates to telephony and more specifically to placing a call on hold while keeping the line available.

2. Introduction

Multiple users call to a conference bridge or are otherwise connected to form conference calls. However, if conference participants want to have a conference call and one of the participants is not at their desk or is otherwise unavailable, that user is unable to join. Further, some participants may have conflicting appointments or may receive other, more important, phone calls. Currently, users can mute the conference call and perform other tasks, but muting the call still ties up the telephone line and does not allow the user to make other phone calls. Similarly, the user can place the conference call on hold, but many telephone systems play some form of hold music while a line is on hold, which may be broadcast to the other conference participants. Even if the music is pleasant and relatively quiet (which is not a guarantee), the background music from a single caller can be distracting to the remaining conference participants. If more than one participant uses this technique, the conference bridge quickly becomes unusable as multiple strains of different 'on hold' music occupy the audio space of the conference.

Further, if a user is part of a conference, and leaves for some reason, the process of rejoining the conference is cumbersome and requires the user to redial and re-enter the conference code or other similar number.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure provides a way for people to gracefully join a conference or other ongoing communication session at an appropriate time in a similar manner to placing the conference call on hold, but without occupying the telephone line. In a conference call, a telephone or other communication device of a called party can periodically, one-time, or continually notify the user, visually or otherwise, of an ongoing call where their presence is desired without tying up the line during the period their presence is needed. The called party can then join the conference with a single button click or other action, such as picking up the telephone receiver and pushing a corresponding conference call button.

In one potential implementation, a button on the called party's device (telephone, smartphone, or other communication client) blinks—almost like a call-on-hold—except that there is no real call and the line is not tied up. A server associated with the conference, which can be a discrete server or a device of one of the conference participants for example, can send periodic messages via a protocol (e.g., "start blinking", "end blinking" messages) indicating a status of the call for which the user is being desired. The status can include information such as the number of users connected, whether or not the conference is ongoing, a currently discussed agenda item, a real-time transcription of the conference text, a call duration, and so forth. If the called user presses that button, the device can display additional information about the ongoing call, such as a title, a recorded voice message, a text message (i.e. "Conference Call with Bob and Alice—started at 1:00 PM—Ongoing"). Optionally, the user can click the button to automatically join the call.

The meta information associated with the blinking light allows the device to quick dial into the call, or inform the server which initiates a call-back to the end-user. For the caller, a called "virtual call on hold" indicator can be left at call initiation time, or in a menu item (e.g., associated with current voicemail) if the called user is not available. The server can maintain a relationship between the ongoing call and the indicator. Therefore, the server can also turn off the indicator if the ongoing call or communication session is terminated.

A called party currently participating in a conference call can place the call on virtual hold, allowing anybody to reach out to them during the duration of the virtual hold, as if the telephone line was not occupied at all. The called party can move the call between virtual hold and unavailable. This allows a user to be available for a call without tying up their line. The user can have several such "virtual calls on hold" ongoing at any given time. The phone line is, by itself, not busy when one or more "virtual call-on-hold" is active. The device can continually display a timed message to a user and enable the user to easily join an in-progress communication session.

Disclosed are systems, methods, and non-transitory computer-readable storage media for accomplishing the virtual call on hold. A client communication device, such as a telephone, smartphone, or computer, receives a notification of a communication session to which the user is invited, and establishes a relationship with the communication session. Alternatively, a server associated with the communication session can establish the relationship with the client communication device. Then, the communication device can present an indication of the relationship with the communication session for a duration of the communication session. The user can join the communication session at will via a communication channel, and the communication channel is not occupied by the communication session unless and until the user joins the communication session.

The communication session can be a conference call, video conference, a multi-modal communication session wherein multiple users communicate via different modalities. The indication can be a blinking light on a set-top phone, a visual indicator on a graphical user interface, or other indicator using one or more output type. The indication can change based on content of the communication session, i.e. the light blinks faster when the user's agenda items are getting closer or are currently being discussed. The user can press a button showing the indication or associated with the indication to join the conference in one click. Establishing the relationship can include communications between the client communication device and the server associated with the conference using a non-speech channel or using non-speech communications sent via a speech channel.

The server identifies a user associated with a communication session, and establishes a relationship with a communication device of the user based on a duration of the communication session. Establishing the relationship can configure an indication to the user at the communication device allowing the user to join the communication session at will without occupying a communication channel to the communication session. The relationship can include metadata such as a conference agenda, a user identity, a conference call-in number, a list of other attendees, an expected or actual duration, and so forth. The server can send periodic or continuous signals to the communication device to adjust the display, functionality, and other features of the indication on the client device. The server can terminate or suspend the relationship when the conference ends. The user can adjust, via the communication device, their status and/or availability with respect to the conference.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example graphical user interface for a placing a call on virtual hold;

FIG. 5 illustrates a sample timeline of interactions between a client and a conference server and a corresponding status of the client device at each interaction;

FIG. 6 illustrates a first example method embodiment; and

FIG. 7 illustrates a second example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for users participating or being available to participate in conference calls without tying up a phone line by placing a phone call on a virtual hold. A brief introductory description of a basic general purpose system or computing device in FIG. 1 which can be employed to practice the concepts is disclosed herein. A more detailed description of the architectures, interfaces, and approaches of the virtual call on hold will then follow. These variations shall be discussed herein as the various embodiments are set forth. The disclosure now turns to FIG. 1.

Figure 1:
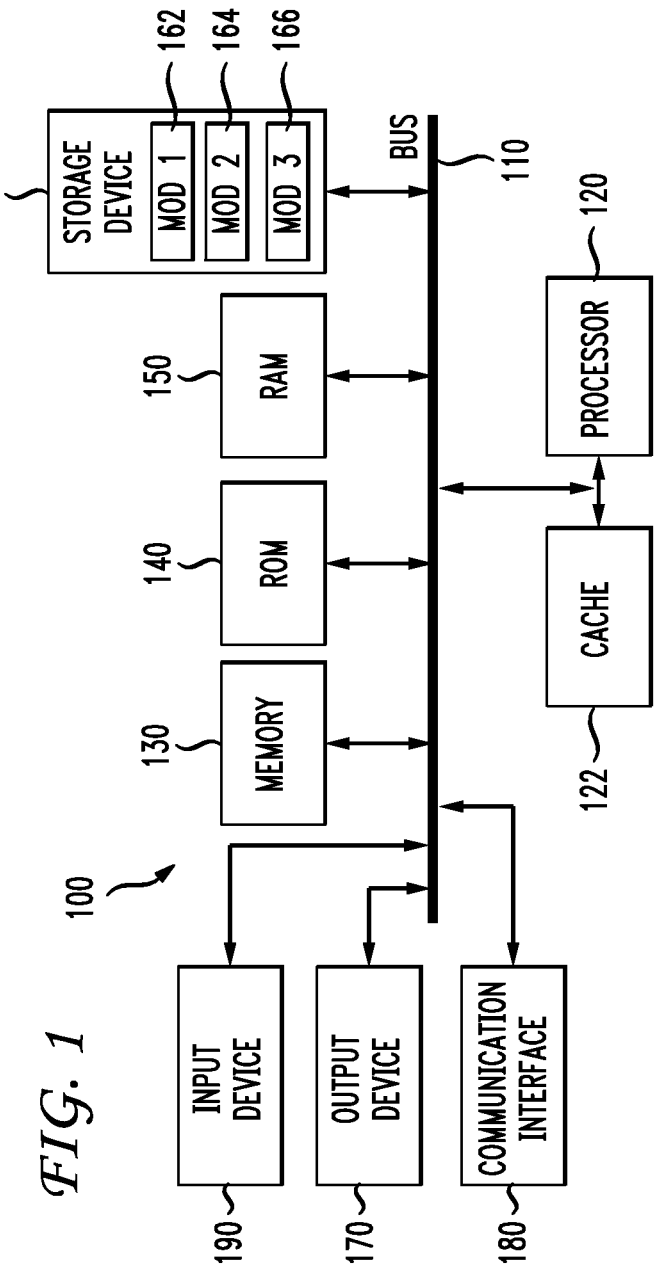
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media or computer readable device which can store data that are accessible by a computer, such as magnetic cassettes, flash memory cards, digital versatile disks, cartridges, random access memories (RAMs) 150, and read only memory (ROM) 140, may also be used in the exemplary operating environment. Computer-readable storage media and devices expressly exclude media such as energy, carrier signals, electromagnetic waves, transitory signals, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
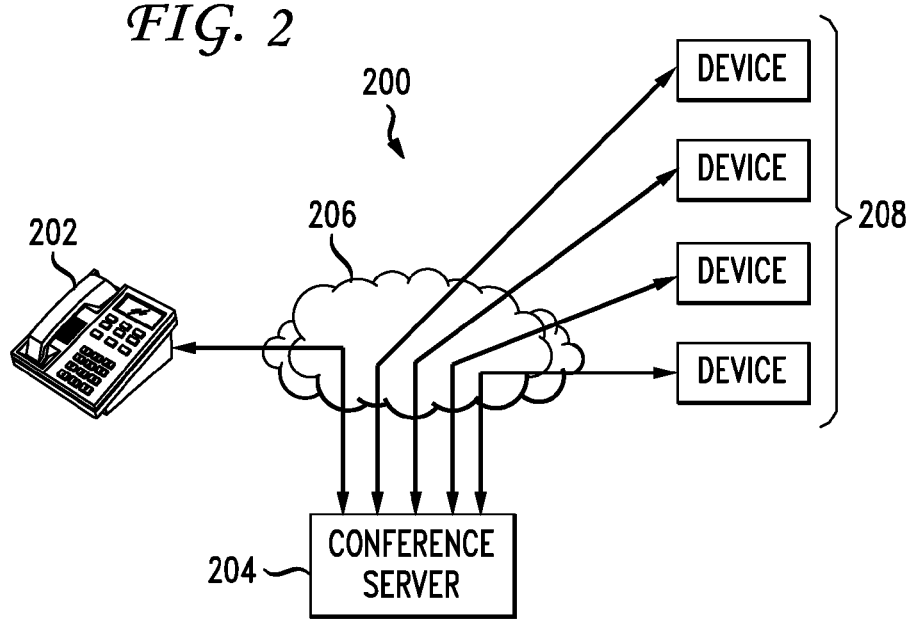
FIG. 2 illustrates an example conference call architecture.
Figure 3:
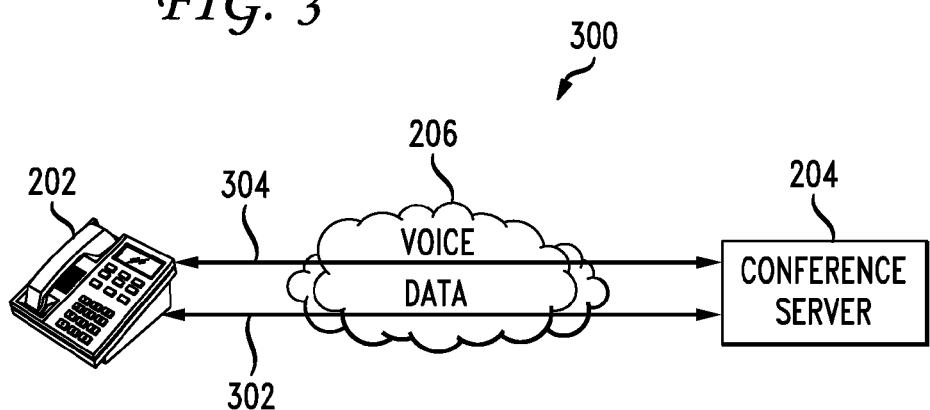
FIG. 3 illustrates exemplary parallel communications between a client device and a conference server.

Having disclosed some components of a computing system, the disclosure now returns to a discussion of the virtual call on hold. FIG. 2 illustrates an example conference call architecture 200. In this architecture 200, a client device 202, such as a telephone, video conferencing client, a smart phone, etc., communicates via a network 206 with a conference server 204. The conference server enables multiple other devices 208 to communicate with the client device 202. The conference server 204 can service multiple discrete conferences. Further, the conference server 204 can also be a peer device in the conference. Typically when a client device 202 such as a telephone participates in a conference with the conference server 204, the line is occupied, tied up, or busy. FIG. 3 shows how a virtual call on-hold system can operate with parallel communication paths for voice and data.

FIG. 3 illustrates an exemplary scenario 300 having parallel communication paths 302, 304 between a client device 202 and a conference server 204. The client device 202 can establish a relationship with the conference server 204 via a data channel 302, which may or may not share the same transmission media as the voice channel 304. Then the client device 202 can establish a virtual call on-hold status for the conference server 204, such that the relationship is preserved and can be transitioned to an actual call, but the virtual call on-hold status does not occupy the voice line 304, leaving the client device 202 available to receive or place other calls. The user can press a button to instantly join to the conference placed on virtual hold, or a current conference participant or automated component, such as an agenda item, can request or trigger a request that the user joins the conference. Via the data channel 302, the client device 202 receives updates to the conference status and instructions for what to display to the user. If the client device 202 is a traditional business telephone, the client device 202 can illuminate a light in a similar manner to a call that is on hold without tying up the line. Signals from the conference server 204 can instruct the client device 202 to change the color, intensity, blinking pattern, or other characteristics of the light as an indication of some aspect of the conference. For example, the light can change colors if the conference participants are requesting the presence of the user of the client device 202. If the client device 202 has a more sophisticated display or user interface, the amount and quality of the information presented can vary.

FIG. 4 illustrates an example graphical user interface 400 for a placing a call on virtual hold. The graphical user interface 400 can display a title 402. The title 402 can be dynamic or static, and can include information such as participants, an agenda item, an associated calendar event title, an ongoing conference duration, and so forth. The graphical user interface 400 can include buttons 404, 406, 408 for interacting with the conference. For example, the user can listen in 404 on the conference which may or may not tie up the telephone line. The user can join 406 the conference with a single click or other action. The user can release the virtual hold 408, thereby severing the relationship with the conference server. Similarly, the conference server can sever the relationship when the conference terminates, at the request of one or more conference participants, or based on some other event. Conference participants can be assigned different levels of authority. For example, only conference administrators may be able to prematurely sever relationships with a virtual call on hold, whereas other participants may have access to send messages to users who have placed the call on virtual hold.

The graphical user interface 400, can also include a live feed 410 of information from the conference call, such as a ticker-tape style scrolling feed of a transcription of the conference call, who is speaking, a list of recent speakers, a currently discussed agenda item, agenda progress, resolutions or action items approved by conference call participants, resources (such as documents, presentations, images, or videos) that are being discussed or that are relevant to the discussion, a page number within a document, and other such information. The live stream can include virtually any metadata that describes the current/recent conversation or provides support for participants in the conference. Further, the graphical user interface 400 can allow the user to handle incoming calls 412, such as by accepting or ignoring them. The user can take an incoming call without disrupting the virtual call on hold.

FIG. 5 illustrates a sample timeline 500 of interactions between a client 502, such as a phone, and a conference server 504 and a corresponding status of the client device at each interaction. At steps 1 and 2, the client 502 receives a notification of the conference and the server 504 and the client 502 establish a relationship. The line is not busy on the client 502 during these steps. At step 3, the conference starts, and the line is still not busy on the client 502, even if the client 502 displays a virtual on-hold light or indicator as if the line was in use. Step 4 indicates a single, periodic, or continuous stream of conference updates to the client 504, during which the line is not busy on the client 502, but during which the client 502 can update its display to reflect the conference updates.

At step 5, the user takes another incoming phone call. The client 502 line is busy with the incoming phone call, but can still display conference updates while the line is busy. At step 6, the user ends the incoming phone call, so the line is not busy and can still continue to display conference updates. At step 7, the user can join the conference, which occupies the line. Then, at step 8, when the user leaves the conference, the line is no longer busy, and can continue to receive and display conference updates to the user.

Having disclosed some basic system components and concepts, the disclosure now turns to the exemplary method embodiment shown in FIGS. 6 and 7. For the sake of clarity, the methods are discussed in terms of an exemplary system 100 as shown in FIG. 1 configured to practice the respective methods. The steps outlined herein are exemplary and can be implemented in any combination thereof, including combinations that exclude, add, or modify certain steps.

FIG. 6 illustrates a first example method embodiment from the perspective of the communication device. The system 100 receives, at a communication device of a user, a notification of a communication session to which the user is invited (602). The communication session can be a conference call, a video conference, or other real-time or substantially real-time communications. The system 100 establishes a relationship with the communication session (604). Establishing the relationship can include communicating with a server associated with the conference.

The system 100 presents, via the communication device, an indication of the relationship with the communication session for a duration of the communication session, such that the user can join the communication session at will via a communication channel, such as a telephone line, and such that the communication channel is not occupied by the communication session unless the user joins the communication session (606). The indication can be a blinking light. The indication can change based on updates describing content of the communication session. For instance, the blinking light can blink faster or slower based on what is going on in the conference call. The light can blink or stay lit, can change color, change intensity, fade in or out, blink in a particular pattern, and so forth. Further, the system can employ multiple lights in conjunction one with another to convey more sophisticated or complex messages.

The user can join the communication session by pressing a button on the communication device associated with the indication. The device can receive from the user a request to join the communication session, and automatically join the user to the communication session via the communication channel, such as by automatically dialing a telephone number and entering a conference code, by establishing a SIP connection to the conference server, and/or by other approaches.

FIG. 7 illustrates a second example method embodiment from the perspective of the conference server. The system 100 identifies a user associated with a communication session (702). The system 100 establishes a relationship with a communication device of the user based on a duration of the communication session (704). The relationship can include or incorporate metadata associated with the user, the communication device, the communication session, and/or other participants. The metadata can further include a conference agenda, user identity, conference call-in number, other attendees, and/or conference duration. Establishing the relationship can include configuring an indication to the user at the communication device allowing the user to join the communication session at will without occupying a communication channel to the communication session (706). The system 100 can send a signal to the communication device to adjust the indication.

The system can, upon receiving a user request for additional information, provide the additional information to the user. For example, the user can push a button to request a list of participants, and the system can return the list of participants. The communication device can output the additional information as text, speech, a blinking light, and/or a light color.

The system can receive, via the communication device, a one-click input from the user, and, in response to the one-click input, join the user to the communication session. If the system detects the end of the communication session, the system can terminate the relationship with the communication device and/or send a signal to the communication device indicating that the communication session is over. The communication device can send information about the user to the system, such as availability information. The system can then transmit at least part of the information to other communication session participants.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, from a server, at a device having a telephone line and microprocessor, a notification of a first live communication session, the telephone line not being used when the notification is received from the server, wherein the first live communication session comprises a voice or video communication session with a plurality of participants communicating with each other;
presenting, at the device, an indication of a relationship between the device and the first live communication session, the telephone line not being used when the indication is being presented;
presenting, at the device, an update describing content of the first live communication session while the device participates in a second live communication session via the telephone line; and
after the second live communication session is terminated and upon receiving a user input to join the first live communication session that does not use the telephone line, joining the device to the first live communication session via the telephone line.

2. The method of claim 1, wherein the first live communication session is one of a conference call or a video conference.

3. The method of claim 1, wherein the indication is a blinking light.

4. The method of claim 1, further comprising:
establishing the relationship between the device and the first live communication session.

5. The method of claim 1, wherein the user input comprises a press of a button associated with the indication.

6. The method of claim 4, wherein establishing the relationship comprises communicating with the server.

7. The method of claim 1, further comprising:
receiving an incoming request to initiate the second live communication session.

8. The method of claim 1, wherein the indication of the relationship comprises an agenda of the first live communication session.

9. The method of claim 8, wherein the agenda comprises an agenda item that triggers a request to be displayed to a user to join the first live communication session.

10. The method of claim 1, wherein the indication of the relationship comprises an light that changes colors if the plurality of participants are requesting a user of the device to join the first live communication session.

11. The method of claim 1, wherein the device receives a user input to request a list of participants in the first live communication session.

12. A system comprising:
a microprocessor; and
a computer-readable storage medium storing instructions which, when executed by the microprocessor, cause the microprocessor to perform operations comprising:
receiving, from a server, at a device having a telephone line, a notification of a first live communication session, the telephone line not being used when the notification is received from the server, wherein the first live communication session comprises a voice or video communication session with a plurality of participants communicating with each other;
presenting, at the device, an indication of a relationship between the device and the first live communication session, the telephone line not being used when the indication is being presented;
presenting, at the device, an update describing content of the first live communication session while the device participates in a second live communication session via the telephone line; and
after the second live communication session is terminated and upon receiving a user input to join the first live communication session that does not use the telephone line, joining the device to the first live communication session via the telephone line.

13. The system of claim 12, wherein the computer-readable storage medium stores additional instructions which, when executed by the microprocessor, cause the micro processor to perform a further operation comprising providing information about the first live communication session to a user upon a user request.

14. The system of claim 13, wherein the information is configured to trigger, at the device, at least one of text, speech, a blinking light, or a light color.

15. The system of claim 12, wherein the computer-readable storage medium stores additional instructions which, when executed by the microprocessor, cause the microprocessor to perform further operations comprising:
establishing the relationship between the device and the first live communication session.

16. The system of claim 12, wherein the relationship comprises metadata.

17. The system of claim 16, wherein the metadata comprises at least one of a conference agenda, user identity, conference call-in number, another attendee, or duration.

18. The system of claim 12, wherein the computer-readable storage medium stores additional instructions which, when executed by the microprocessor, cause the microprocessor to perform a further operation comprising sending a signal to the device to adjust the indication.

19. The system of claim 12, wherein the computer-readable storage medium stores additional instructions which, when executed by the microprocessor, cause the microprocessor to perform further operations comprising:
   upon detecting an end of the first live communication session, terminating the relationship.

20. The system of claim 12, wherein the computer-readable storage medium stores additional instructions which, when executed by the microprocessor, cause the microprocessor to perform further operations comprising:
   receiving availability data of a user from the device; and
   transmitting the availability data to other communication session participants of the first communication session.

* * * * *